United States Patent
Mauriz-Barcos et al.

(10) Patent No.: US 12,017,898 B2
(45) Date of Patent: Jun. 25, 2024

(54) ARTICLE FEEDING DEVICE

(71) Applicant: Arthur G. Russell Co., Bristol, CT (US)

(72) Inventors: Christian Mauriz-Barcos, Prospect, CT (US); Rande King, Terryville, CT (US)

(73) Assignee: ARTHUR G. RUSSELL CO., Bristol, CT (US)

( * ) Notice: Subject to any disclaimer, the term of this patent is extended or adjusted under 35 U.S.C. 154(b) by 157 days.

(21) Appl. No.: 17/704,288

(22) Filed: Mar. 25, 2022

(65) Prior Publication Data

US 2022/0402741 A1 Dec. 22, 2022

Related U.S. Application Data

(60) Provisional application No. 63/142,656, filed on Jan. 28, 2021.

(51) Int. Cl.
*B65G 47/22* (2006.01)
*B67B 3/064* (2006.01)

(52) U.S. Cl.
CPC ...... *B67B 3/0645* (2013.01); *B67B 2201/017* (2013.01)

(58) Field of Classification Search
CPC ............... B67B 3/0645; B67B 2201/017
USPC ........ 198/375, 376, 382, 395, 398, 399, 401
See application file for complete search history.

(56) References Cited

U.S. PATENT DOCUMENTS

| | | | | |
|---|---|---|---|---|
| 2,974,773 A | * | 3/1961 | Vaughan | B65G 47/1471 |
| | | | | 198/399 |
| 4,006,812 A | * | 2/1977 | Everett | B67B 3/0645 |
| | | | | 198/396 |
| 4,111,295 A | * | 9/1978 | Rutherford | B65G 47/256 |
| | | | | 198/399 |
| 4,209,899 A | * | 7/1980 | Dragotta | B23P 19/04 |
| | | | | 29/786 |
| 8,136,651 B2 | * | 3/2012 | Cassoni | B67B 3/0645 |
| | | | | 198/408 |

(Continued)

FOREIGN PATENT DOCUMENTS

DE    60106201 T2  *  2/2005

OTHER PUBLICATIONS

Espacenet machine translation of DE60106201T2; https://translationportal.epo.org/emtp/translate/?ACTION=description-retrieval&COUNTRY=DE&ENGINE=google&FORMAT=docdb&KIND=T2&LOCALE=en_EP&NUMBER=60106201&OPS=ops.epo.org/3.2&SRCLANG=de&TRGLANG=en (Year: 2005).*

*Primary Examiner* — Leslie A Nicholson, III

(74) *Attorney, Agent, or Firm* — McCormick, Paulding & Huber, PLLC

(57) ABSTRACT

According to the present disclosure, an article feeding device that reliably and consistently outputs properly oriented articles includes an input configured to receive articles, an output configured to dispense properly oriented articles, an orientation alteration portion between the input and output, and an orientation control system. The orientation alteration portion includes a first track configured to allow properly oriented articles to pass therethrough without alteration and a second track configured to alter the orientation of improperly oriented articles. The orientation control system is configured to detect orientation of the articles at the input and to send the articles to either the first track or the second track depending upon the detected orientation.

18 Claims, 10 Drawing Sheets

(56) References Cited

U.S. PATENT DOCUMENTS 10,207,835 B2 * 2/2019 Wilhelm ................ B67B 3/064

* cited by examiner

ARTICLE FEEDING DEVICE

CROSS-REFERENCE TO RELATED APPLICATION

This application claims the benefit of U.S. Provisional Patent Application No. 63/142,656, filed on Jan. 28, 2021, which is incorporated herein by reference in its entirety.

TECHNICAL FIELD

This present disclosure relates to article feeding devices.

BACKGROUND

Article feeding devices are used to properly orient and advance articles passing through bottling lines, assembly lines, packaging lines, and the like. Vibration and shaking are commonly used as methods for moving and changing the orientation of articles as the articles pass through article feeding devices. For some article feeding devices, such as a cap feeder in a bottling line, vibration and shaking in bowl-type cap feeders still results in improperly oriented caps, which reduces throughput since the improperly oriented caps must be reprocessed through the feeder.

SUMMARY

The present disclosure provides an article feeding device that reliably and consistently outputs properly oriented articles and, in particular, provides a cap feeder that properly orients caps in a bottling line. The article feeding device according to the present disclosure comprises an input configured to receive articles, an output configured to dispense properly oriented articles, an orientation alteration portion between the input and output, and an orientation control system. The orientation alteration portion includes a first track configured to allow properly oriented articles to pass therethrough without alteration and a second track configured to alter the orientation of improperly oriented articles. The orientation control system is configured to detect orientation of the articles at the input and to send the articles to either the first track or the second track depending upon the detected orientation.

The article feeding device according to the present disclosure may further comprises a first orientation portion configured to arrange the articles in either a first orientation or a second orientation before being received at the input. The orientation control system may be configured to determine whether the articles are in the first orientation or the second orientation. The first orientation may corresponding to a properly oriented article, while the second orientation corresponds to an improperly oriented article.

According to the present disclosure, the orientation control system may include a camera configured to provide image data of the articles at the input and the orientation control system may determine whether the articles are in the first orientation or the second orientation by comparing the image data to a stored image. The orientation control system may control a servo dial to transport the articles from the input to the first track or the second track based on the determination.

According to the present disclosure, a cap feeder for providing bottle caps to a bottling line is described. The cap feeder comprises a bin configured to receive caps in bulk, a first orientation portion configured to receive the caps from the bin and to provide the caps to a second orientation portion in either a first orientation or a second orientation, and a second orientation portion configured to receive the caps from first orientation portion in the first orientation and the second orientation. The second orientation portion comprises an input, first and second output paths connected to the input, a servo dial located at the interface between the input and the first and second output paths, and an orientation control system configured to determine whether each individual cap at the input is in the first orientation or the second orientation and to control the servo dial to send the individual cap to the first output track or the second output track based on the determination.

According to the present disclosure, the second orientation portion of the cap feeder may further comprise an orientation alteration portion. The orientation alteration portion includes a chute connected to the first output track and a helical path connected to the second output track. The chute is configured to allow properly oriented caps to pass through without alteration and the helical path is configured to invert the caps passing therethrough.

According to the present disclosure, the orientation control system of the cap feeder includes a camera or similar imaging sensor configured to provide image data of each individual cap at the input. The orientation control system is configured to determine whether each individual cap is in the first orientation or the second orientation by comparing the image data to a stored image of a properly or improperly oriented cap.

These and other objects, features and advantages of the present disclosure will become apparent in light of the detailed description of embodiments thereof, as illustrated in the accompanying drawings.

DETAILED DESCRIPTION

Before the various embodiments are described in further detail, it is to be understood that the invention is not limited to the particular embodiments described. It will be understood by one of ordinary skill in the art that the article feeding device described herein may be adapted and modified as is appropriate for the application being addressed and that the components of the article feeding device described herein may be employed in other suitable applications, and that such other additions and modifications will not depart from the scope thereof.

Figure 1:
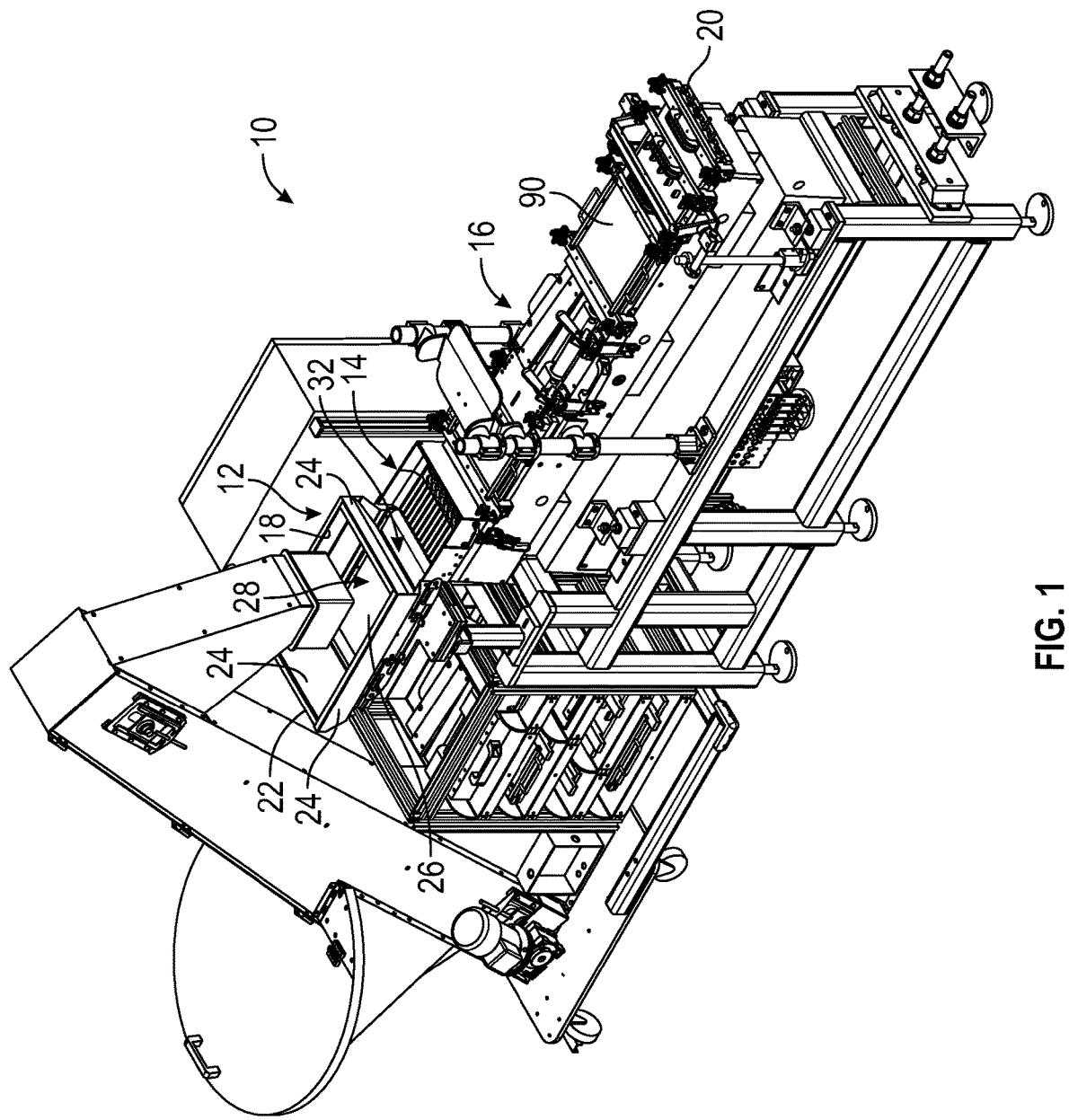
FIG. 1 is a front, top perspective view of an article feeding device according to the present disclosure.
Figure 2:
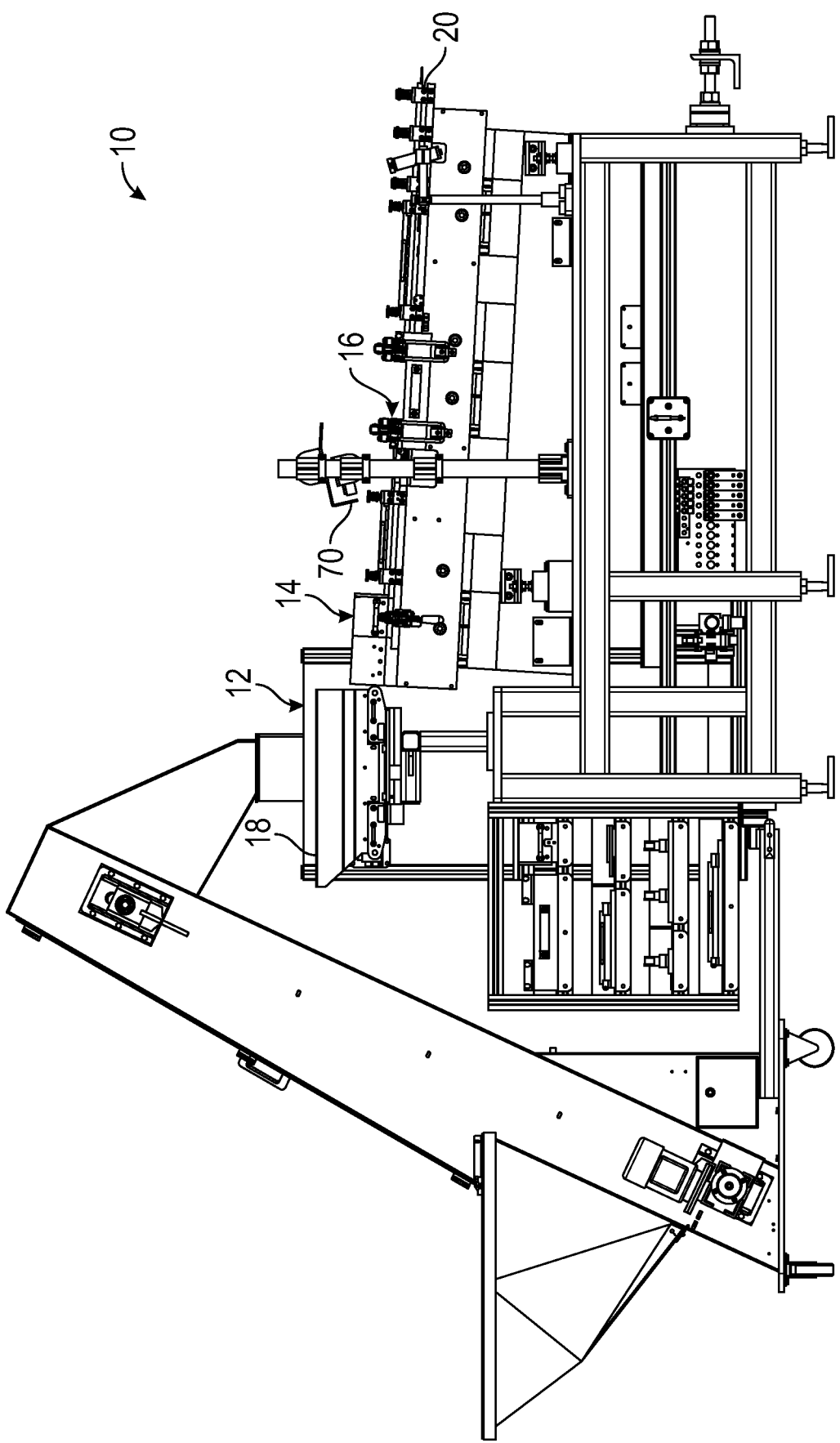
FIG. 2 is a front view of the article feeding device of FIG. 1.

Referring to FIGS. 1 and 2, an article feeding device according to the present disclosure in the form of a cap feeder 10 is shown. The cap feeder 10 includes a bin portion 12, a first orientation portion 14, and a second orientation portion 16 arranged in series between an input 18 and an output 20 of the cap feeder 10.

Figure 3:
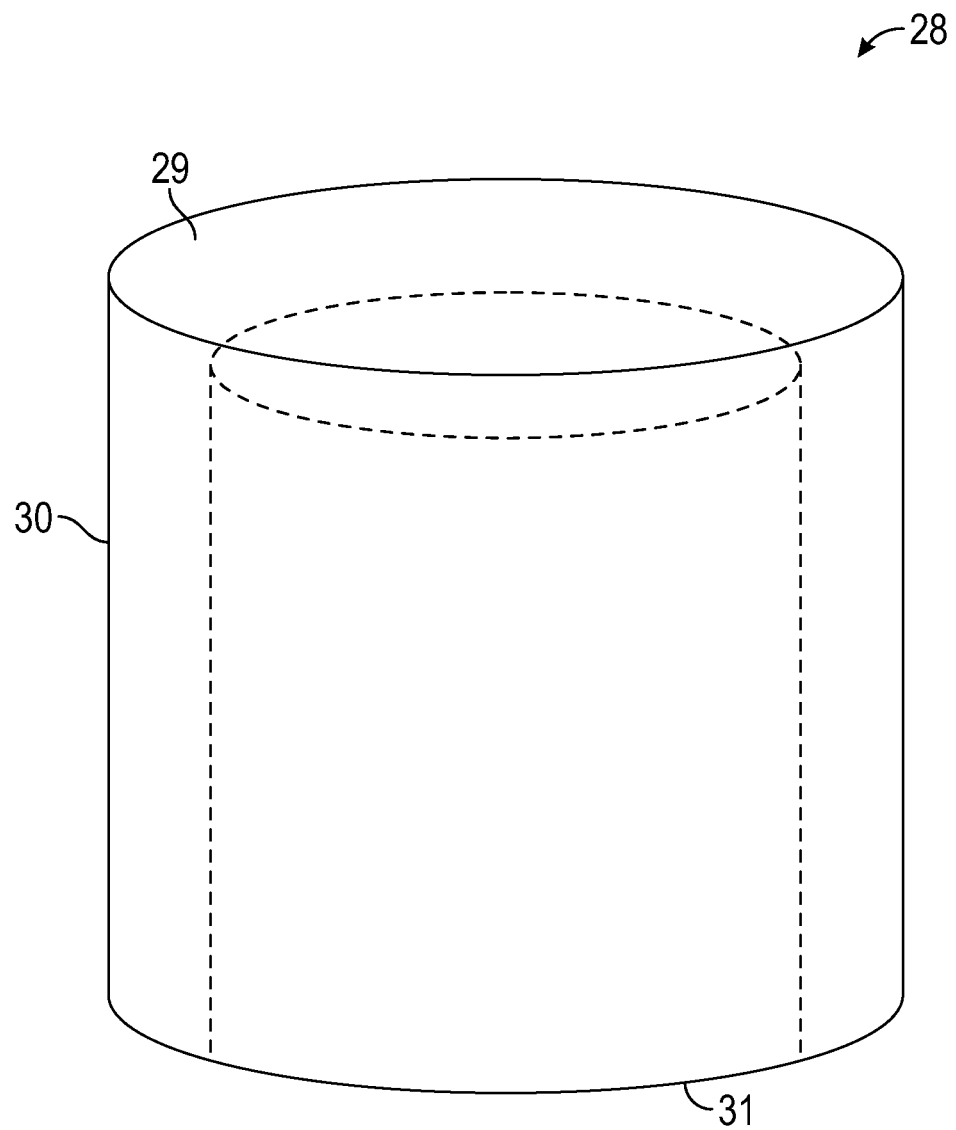
FIG. 3 is a front, top perspective view of an exemplary article for processing through the article feeding device of FIG. 1.

The bin portion 12 has an open upper end 22 forming the input 18 to the cap feeder 10, side walls 24, and a floor 26 forming an interior space configured received bottle caps 28 through the open upper end 22. Referring to FIG. 3, each cap 28 has the shape of a typical bottle cap, with a closed top 29, cylindrical side wall 30 having internal threads, and open bottom 31 configured to receive the threaded mouth portion of a bottle to allow the internal threads of the cap 28 to engage the bottle.

Figure 4:
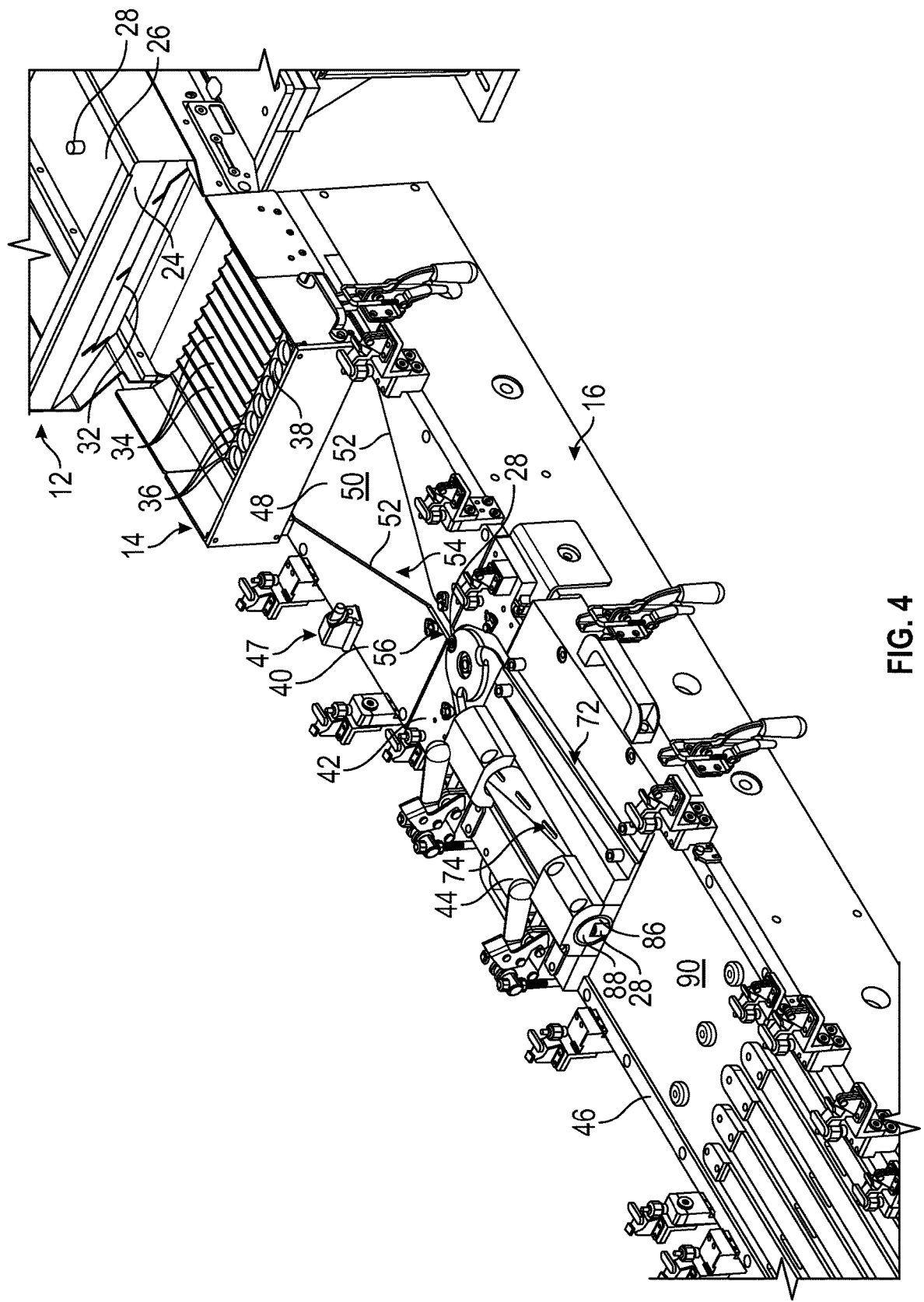
FIG. 4 is an enlarged back, top perspective view of a portion of the article feeding device of FIG. 1.

Referring FIGS. 1 and 4, the bin portion 12 includes an exit 32 through one of the side walls 24 at the floor 26. The floor 26 is moveable and configured to transport caps 28 from within the interior space of the bin portion 12 through the exit 32 to the first orientation portion 14. For example, as shown, the floor 26 is a conveyor belt. However, other similar article transport systems are within the scope of the present disclosure and may be used in place of the conveyor belt. The exit 32 may have a height that is sized to allow only a single layer of caps 28 to pass therethrough to the first orientation portion 14.

As seen in FIG. 2, the first orientation portion 14 and second orientation portion 16 have a downward slope relative to the horizontal direction between the input 18 and the output 20. Unless otherwise discussed herein, vibration is used to urge the caps 28 along this downward slope through the first orientation portion 14 and second orientation portion 16.

Figure 5:
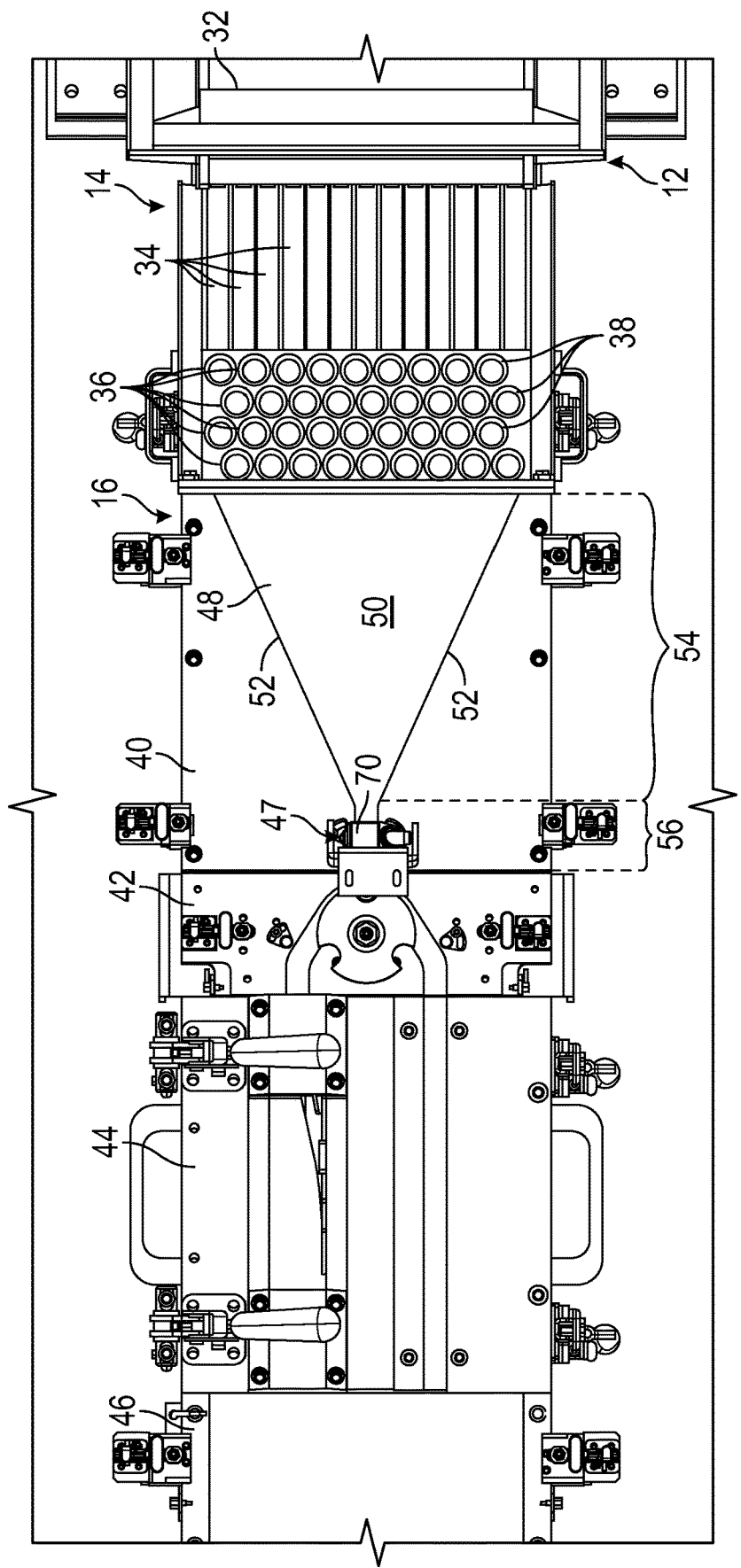
FIG. 5 is an enlarged top view of a portion of the article feeding device of FIG. 1.

Referring to FIGS. 4 and 5, the first orientation portion 14 includes a plurality of straightening channels 34 followed by a plurality of exit holes 36. Each straightening channel 34 has a semi-cylindrical shape, and the straightening channels 34 are parallel and adjacent to one another and extend away from the bin portion 12 toward the exit holes 36. The exit holes 36 are vertically arranged cylindrical holes sized to be slightly larger than the caps 28 so that the caps 28 can only pass through the exit holes 36 with the closed cap top 29 or open cap bottom 31 facing downward. The exit holes 36 may include an inverted conical entry surface 38 to facilitate entry of the caps 28 into the exit holes 36.

The straightening channels 34 are positioned to receive the caps 28 exiting the bin 12 through the exit 32 of the bin portion 12 and to pass the caps 28 to the plurality of exit holes 36 through vibration of the first orientation portion 14. The semi-cylindrical shape of the straightening channels 34 orients the caps 28 with either their tops 29 or bottoms 31 facing the exit holes 36 as the caps move through the channels 34. This results in the caps 28 dropping out of the channels 34 at the exit holes 36 with the top 29 or bottom 31 facing downward. The vibration of the first orientation portion 14 then causes the caps 28 to drop downward through the exit holes 36 onto the second orientation portion 16.

The second orientation portion 16 includes a funneling tray 40, a sorting tray 42, an orientation tray 44, and an exit tray 46 arranged in series and an orientation control system 47 configured to control the sorting tray 42. The funneling tray 40 includes a track 48 having a bottom surface 50 and two side walls 52. The track is configured to receive the caps 28 dropping through the exit holes 36 of the first orientation portion 14, with the top 29 or bottom 31 of each cap 28 resting on the bottom surface 50 of the track. In a first portion 54 of the track 48, the side walls 52 are angled toward one another along the length of the first portion 54 in order to reduce the width of the track 48 from an initial width sized to allow the plurality of caps 28 being received from the exit holes 36 of the first orientation portion 14 to fit within the track 48 to a final width, the final width being sized to fit only a single cap 28 within the track 48. In a second portion 56 of the track 48, the side walls 52 are parallel, so that the second portion 56 maintains the final width of the track 48 and only allows a single cap 28 to pass at a time. The output of the second portion 56 of the track 48 of the funneling tray 40 is connected to the sorting tray 42.

Figure 6:
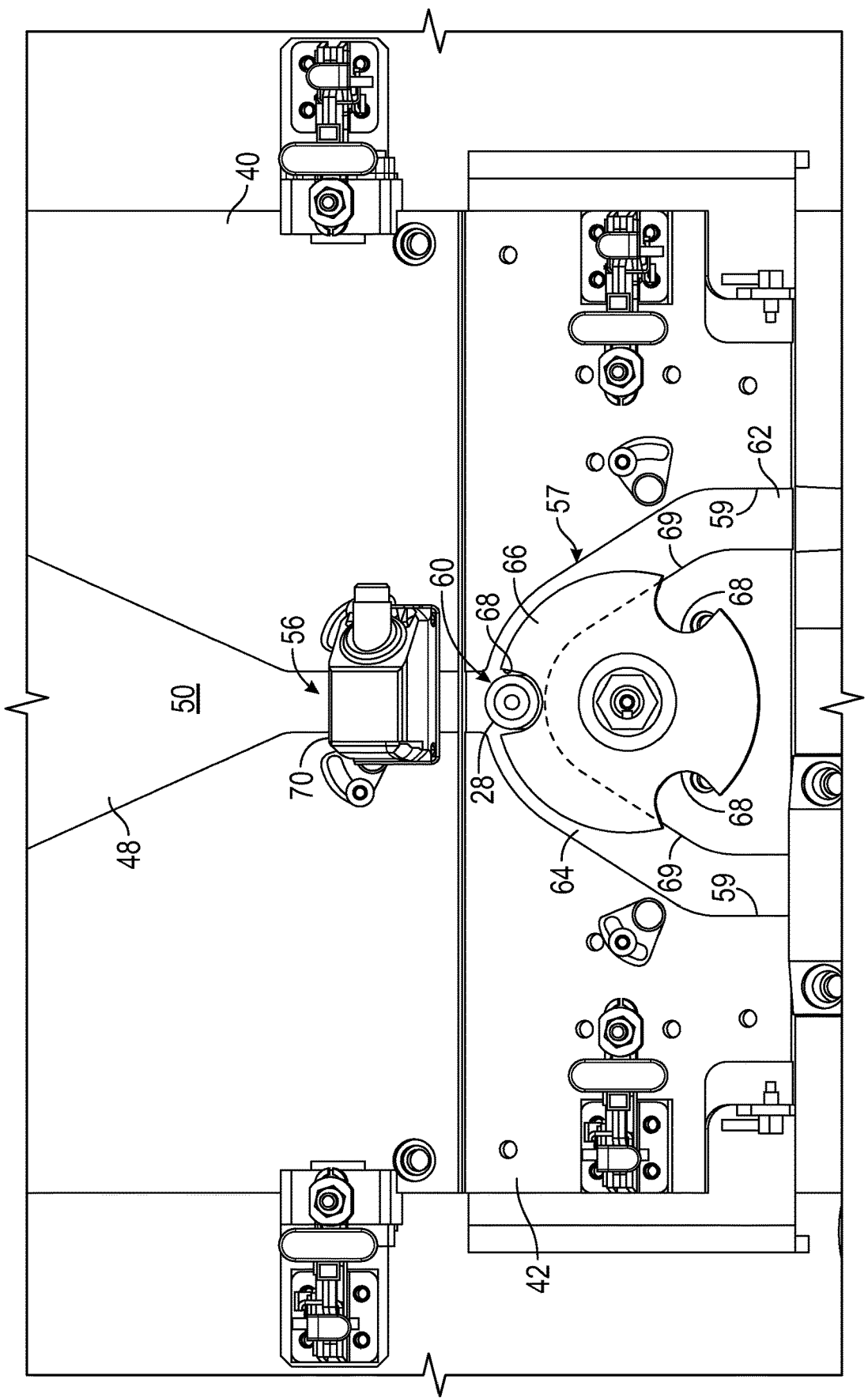
FIG. 6 is an enlarged top view of a portion of the article feeding device of FIG. 1.

Referring to FIG. 6, the sorting tray 42 includes a branching track 57 having a bottom surface 58 and side walls 59 that form an input 60, a first output track 62, and a second output track 64, all having widths sized to allow the caps 28 to pass serially through the respective tracks. The sorting tray 42 also includes a servo dial 66 positioned above the interface of the input 60 with the first output track 62 and second output track 64 at the upper end of the side walls 59. The servo dial 66 has a circular disk shape with three transport notches 68 formed in the outer circumference thereof and is configured to be driven in rotational movement about its central axis by a servo motor. The transport notches 68 are equally spaced about the circumference of the servo dial 66 and each transport notch 68 is sized to fit a single cap 28 therein.

The input 60 is configured to receive the caps 28 from the funneling tray 40 as they serially exit the second portion 56. The servo dial 66 is configured to accommodate each cap 28 from the input 60 in one of its transport notches 68 and to direct the cap 28 to either the first output track 62 or the second output track 64 depending upon an orientation of the cap 28. The first output track 62 and the second output track 64 may be formed as cam paths having inner wall surfaces 69 that urge the caps 28 out of the transport notches 68 as the servo dial 66 rotates toward the respective first output track 62 or the second output track 64 in order to avoid jamming of the servo dial 66. Each time the servo dial 66 rotates to transport a cap 28 within the transport notch 68 proximate the input to either the first output track 62 or the second output track 64, the servo dial 66 does so through a 120 degree rotation so that another one of the transport notches 68 is located proximate the input 60.

Figure 7:
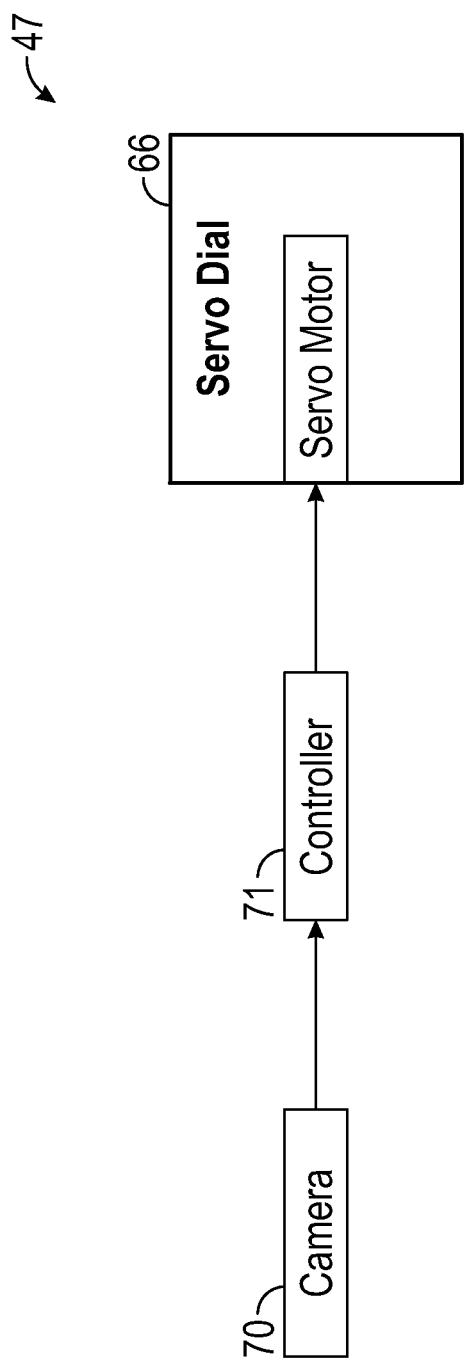
FIG. 7 is schematic diagram of an orientation control system of the article feeding device of FIG. 1.

Referring to FIGS. 6 and 7, the orientation control system 47 includes a camera 70, or other similar sensor, positioned over the second portion 56 of track 48, as seen in FIG. 6, and a controller 71 operatively coupled to the camera 70 and to the servo motor that rotates the servo dial 66. The camera 70 is configured to view each cap 28 as the cap 28 passes through the second portion 56 into the input 60 of the sorting tray 44 and to provide the image data to the controller for each cap 28. The controller 71 is configured to use the image data from the camera 70 for each cap 28 to determine if the respective cap 28 is oriented correctly, with its top 29 facing up and its bottom 31 resting on the bottom surface 50 of the track 48, or oriented incorrectly, with its bottom 31 facing up and its top 29 resting on the bottom surface 50 of the track 48. For example, the controller 71 may make the determination by comparing the image data to a stored image of a cap top or bottom. Based on this determination, the controller 71 controls the servo motor to rotate servo dial 66 clockwise or counterclockwise to move the respective cap 28 within a transport notch 68 from the input 60 to either the first output track 62 or the second output track 64. In particular, if the controller 71 determines that the cap 28 is oriented correctly, with its top 29 facing up and its bottom 31 resting on the bottom surface of the track, the servo dial 66 is rotated clockwise to deliver the respective cap 28 to the first output track 62. Alternatively, if the controller 71 determines that the cap 28 is oriented incorrectly, with its bottom 31 facing up and its top 29 resting on the bottom surface of the track, the servo dial 66 is rotated counter-clockwise to deliver the respective cap 28 to the second output track 64.

The orientation control system 47, including the camera 70, controller 71, and/or servo motor, includes all of the necessary electronics, software, memory, storage, databases, firmware, logic/state machines, microprocessors, communication links, and any other input/output interfaces to perform the functions described herein and/or to achieve the results described herein. For example, the controller 71, may include, or be in communication with, one or more processors and memory, which may include system memory, including random access memory (RAM) and read-only memory (ROM). Suitable computer program code may be provided to the controller 71 for executing numerous functions, including those discussed in connection with the orientation control system 47.

The one or more processors may include one or more conventional microprocessors and may also include one or more supplementary co-processors such as math co-processors or the like. The one or more processors may be configured to communicate with other networks and/or devices such as servers, other processors, computers, sensors, and the like.

The one or more processors may be in communication with the memory, which may comprise magnetic, optical and/or semiconductor memory, such as, for example, random access memory ("RAM"), read only memory ("ROM"), flash memory, optical memory, or a hard disk drive memory. Memory may store any data and/or information typically found in computing devices, including an operating system, and/or one or more other programs (e.g., computer program code and/or a computer program product) that are stored in a non-transitory memory portion and adapted to direct the orientation control system 47, including the controller 71, to perform according to the various embodiments discussed herein. The orientation control system 47 and/or portions thereof, and/or any other programs may be stored, for example, in a compressed format, an uncompiled and/or an encrypted format, and may include computer program code executable by the one or more processors. The executable instructions of the computer program code may be read into a main memory of the one or more processors from a non-transitory computer-readable medium other than the memory. While execution of sequences of instructions in the program causes the one or more processors to perform the process steps described herein, hard-wired circuitry may be used in place of, or in combination with, executable software instructions for implementation of the processes of the present invention. Thus, embodiments of the present invention are not limited to any specific combination of hardware and software.

The term "computer-readable medium" as used herein refers to any medium that provides or participates in providing instructions and/or data to the one or more processors of the orientation control system 47 (or any other processor of a device described herein) for execution. Such a medium may take many forms, including but not limited to, non-volatile media or memory and volatile memory. Non-volatile memory may include, for example, optical, magnetic, or opto-magnetic disks, or other non-transitory memory. Volatile memory may include dynamic random access memory (DRAM), which typically constitutes the main memory or other transitory memory.

Figure 8:
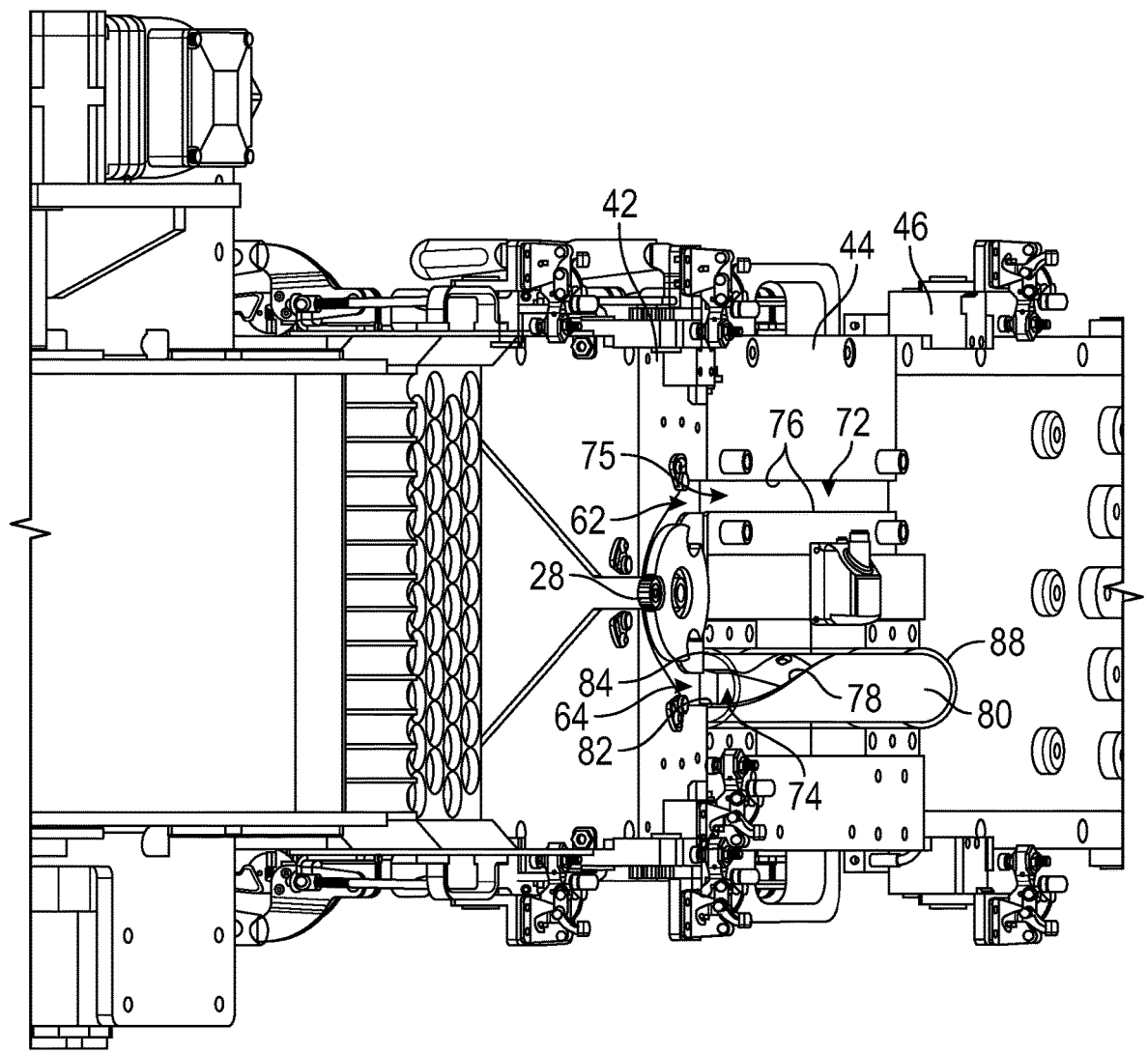
FIG. 8 is a left, top perspective view of a portion of the article feeding device of FIG. 1.
Figure 9:
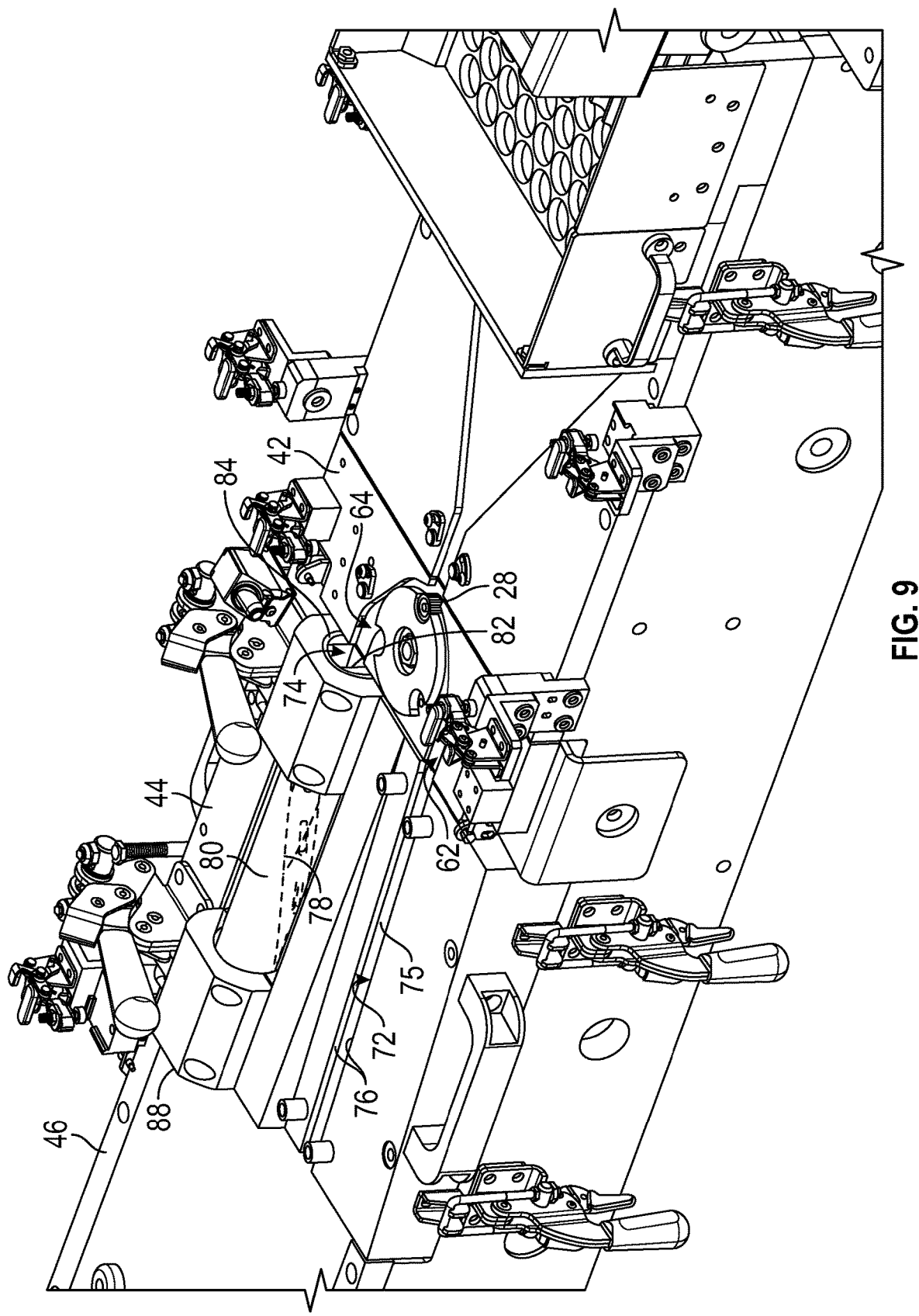
FIG. 9 is a back, top perspective view of a portion of the article feeding device of FIG. 1.
Figure 10:
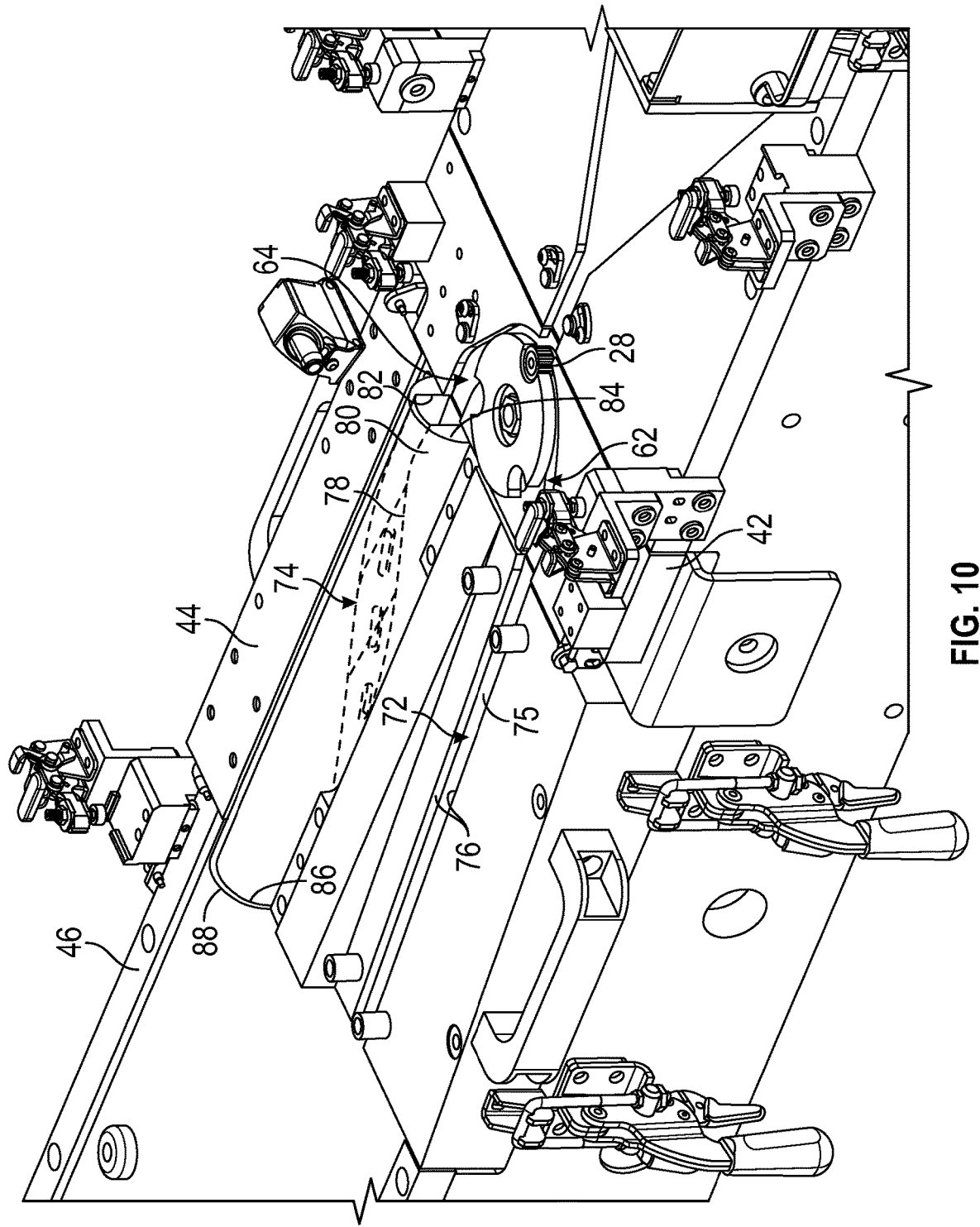
FIG. 10 is an enlarged back, top perspective view of a portion of the article feeding device of FIG. 1.

Referring to FIGS. 8-10, the orientation tray 44 includes a first orientation track 72 connected to the first output track 62 of the sorting tray 42 and a second orientation track 74 connected to the second output track 64 of the sorting tray 42. The first orientation track 72 is formed as a straight chute that includes a bottom surface 75 and parallel guide walls 76 extending along the length of the orientation tray 44. The first orientation track 72 is configured to receive caps 28 from the first output track 62 and to support the caps 28 on the bottom surface 75 while allowing the caps 28 to pass through the first orientation track 72 to exit tray 46, for example, by vibratory motion of the like, without changing an orientation of the caps 28. The second orientation track 74 is formed as a helix 78 within a tube 80 extending along the length of the orientation tray 44. The helix 78 has an input opening 82 at an input end 84 of the tube 80 and an output opening 86, also seen in FIG. 4, at an output end 88 of the tube 80. The cross section of the input opening 82 rotates 180 degrees along the length of the helix 78 such that the output opening 86 is a 180-degree inversion of the input opening 82. The second orientation track 74 is configured to receive incorrectly oriented caps 28 from the second output track 64 and to invert the caps 28 by allowing the caps 28 to pass through the helix 78, for example, by vibratory motion of the like. Thus, caps 28 enter the helix 78 with their bottoms 31 facing up and exit the helix 78 into the exit tray 46 with their bottoms 31 facing down.

Referring back to FIG. 4, the exit tray 46 includes an exit tray track 90 extending from the orientation tray 44 to the output 20 of the cap feeder 10, shown in FIG. 1. The caps 28 exit the orientation tray 44 from either the first orientation track 72 or the second orientation track 74 into exit tray track 90 of the exit tray 46 and, in either case, are properly oriented. The caps pass through the exit tray track 90 to the output 20 of the cap feeder 10, shown in FIG. 1, for further use in the bottling process.

Thus, in operation, caps 28 may be dumped in bulk into the bin portion 12 of the cap feeder 10. The caps 28 then pass through the first orientation portion 14, where each cap is oriented on the track with either its top 29 or bottom 31 in contact with the track. The caps 28 are then fed into the second orientation portion 16, where the caps 28 are sorted between those with their tops 29 in contact with the track and those with their bottoms 31 in contact with the track. Those with their bottoms 31 in contact with track are passed through the second orientation portion 16 to the output 20 of the cap feeder 10 without a change in orientation, while those with their tops 29 in contact with the track are inverted to have their bottoms 31 in contact with the track and then passed to the output 20 of the cap feeder 10.

The present disclosure advantageously provides a cap feeder 10 that achieves 100% throughput, with all caps 28 being properly oriented after a single pass through the cap feeder 10. This is a significant improvement over conventional bowl-type shaker cap feeders, in which a large percentage of caps must be reprocessed.

The present disclosure also provides a cap feeder 10 that is easily customizable to process different types of caps. In particular, the various channels, exit holes, and tracks of the first and second orientation portions 14, 16 described herein, may be formed on removable trays so that appropriately sized channels, holes, and tracks may be selected and/or designed based on the cap being processed through the cap feeder 10. Similarly, the image of the cap top or bottom stored in the controller 71 for comparison to the image data during processing may also be updated based on the cap being processed through the cap feeder 10.

While the principles of the present disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure. For example, while the article feeding device of the present disclosure has been described as a cap feeder, present disclosure is not limited to cap feeders and the orientation systems described herein may be implemented in various other forms of article feeding devices.

What is claimed is:

1. An article feeding device comprising:
   an input configured to receive articles;
   an output configured to dispense properly oriented articles;
   an orientation alteration portion between the input and output, the orientation alteration portion including a first track configured to allow properly oriented articles to pass therethrough without alteration and a second track configured to alter the orientation of improperly oriented articles;
   an orientation control system configured to detect orientation of the articles at the input and to send the articles to either the first track or the second track depending upon the detected orientation; and
   a servo dial controlled by the orientation control system, the servo dial configured to transport the articles from the input to the first track or the second track.

2. The article feeding device according to claim 1, further comprising a first orientation portion configured to arrange the articles in either a first orientation or a second orientation before being received at the input.

3. The article feeding device according to claim 2, wherein the orientation control system is configured to determine whether the articles are in the first orientation or the second orientation, the first orientation corresponding to a properly oriented article and the second orientation corresponding to an improperly oriented article.

4. The article feeding device according to claim 3, wherein the orientation control system includes a camera configured to provide image data of the articles at the input.

5. The article feeding device according to claim 4, wherein the orientation control system determines whether the articles are in the first orientation or the second orientation by comparing the image data to a stored image.

6. A cap feeder for providing bottle caps in a bottling line, the cap feeder comprising:
   an input configured to receive caps;
   an output configured to dispense properly oriented caps;
   an orientation alteration portion between the input and output, the orientation alteration portion including a first track configured to allow properly oriented caps to pass therethrough without alteration and a second track configured to alter the orientation of improperly oriented caps;
   an orientation control system configured to detect orientation of the caps at the input and to send the caps to either the first track or the second track depending upon the detected orientation; and
   a servo dial controlled by the orientation control system, the servo dial configured to transport the caps from the input to the first track or the second track.

7. The cap feeder according to claim 6, further comprising a first orientation portion configured to arrange the caps in either a first orientation or a second orientation before being received at the input.

8. The cap feeder according to claim 7, wherein the first orientation corresponds to caps being supported on a bottom surface having a threaded opening and the second orientation corresponds to caps being supported on a flat top surface.

9. The cap feeder according to claim 8, wherein the first orientation portion comprises a plurality of parallel semi-cylindrical channels followed by a plurality of exit holes formed perpendicular to the channels;
   wherein the semi-cylindrical channels are configured to orient the caps with bottom or top surfaces facing the exit holes; and
   wherein the exit holes are configured to only allow caps to fall therethrough with top or bottom surfaces facing downward.

10. The cap feeder according to claim 8, wherein the orientation control system is configured to determine whether the caps are in the first orientation or the second orientation.

11. The cap feeder according to claim 10, wherein the orientation control system includes a camera configured to provide image data of the caps at the input.

12. The cap feeder according to claim 11, wherein the orientation control system determines whether the caps are in the first orientation or the second orientation by comparing the image data to a stored image.

13. The cap feeder according to claim 12, wherein the stored image is an image of a properly oriented cap.

14. The cap feeder according to claim 12, wherein the stored image is an image of an improperly oriented cap.

15. The cap feeder according to claim 6, wherein the servo dial comprises three equally spaced transport notches formed in its peripheral surface, each transport notch configured to accommodate a cap therein.

16. A cap feeder for providing bottle caps to a bottling line, the cap feeder comprising:
   a bin configured to receive caps in bulk;
   a first orientation portion configured to receive the caps from the bin and to provide the caps to a second orientation portion in either a first orientation or a second orientation;
   a second orientation portion configured to receive the caps from first orientation portion in the first orientation and the second orientation, the second orientation portion comprising:
      an input;
      first and second output paths connected to the input;
      a servo dial at the interface between the input and the first and second output paths; and
      an orientation control system configured to determine whether each individual cap at the input is in the first orientation or the second orientation and to control the servo dial to send the individual cap to the first output track or the second output track based on the determination.

17. The cap feeder according to claim 16, wherein the second orientation portion further comprises an orientation alteration portion, the orientation alteration portion including a chute connected to the first output track and a helical path connected to the second output track, the chute being configured to allow properly oriented caps to pass therethrough without alteration, and the helical path being configured to invert the caps passing therethrough.

18. The cap feeder according to claim 17, wherein the orientation control system includes a camera configured to provide image data of each individual cap at the input; and wherein the orientation control system is configured to determine whether each individual cap is in the first orientation or the second orientation by comparing the image data to a stored image of a properly or improperly oriented cap.

* * * * *